(12) United States Patent
Ferte et al.

(10) Patent No.: US 7,334,332 B2
(45) Date of Patent: Feb. 26, 2008

(54) METHOD OF MANUFACTURING A HOLLOW BLADE FOR A TURBINE ENGINE

(75) Inventors: Jean-Pierre Ferte, Corbeil Essonnes (FR); Jean-michel Franchet, Paris (FR); Daniel Lhomme, Bessancourt (FR); Alain Lorieux, Sannois (FR)

(73) Assignee: Snecma Moteurs, Paris (FR)

( * ) Notice: Subject to any disclaimer, the term of this patent is extended or adjusted under 35 U.S.C. 154(b) by 534 days.

(21) Appl. No.: 10/847,863

(22) Filed: May 19, 2004

(65) Prior Publication Data

US 2005/0005445 A1  Jan. 13, 2005

(30) Foreign Application Priority Data

May 27, 2003 (FR) .................... 03 50183

(51) Int. Cl.
*B21D 53/78* (2006.01)
(52) U.S. Cl. ............................. 29/889.72
(58) Field of Classification Search ........... 29/889.72, 29/889.71, 889.7, 421.1
See application file for complete search history.

(56) References Cited

U.S. PATENT DOCUMENTS

| | | |
|---|---|---|
| 1,516,556 A | 11/1924 | Wilkinson |
| 2,767,460 A | 10/1956 | Schultz |
| 3,045,967 A | 7/1962 | Clarke et al. |
| 3,196,526 A | 7/1965 | Amos et al. |
| 3,768,147 A | 10/1973 | Berry et al. |
| 3,936,920 A | 2/1976 | Conn, Jr. |
| 3,982,854 A | 9/1976 | Berry et al. |
| 4,583,274 A | 4/1986 | Moracz et al. |
| 4,882,823 A | 11/1989 | Weisert et al. |
| 5,063,662 A | 11/1991 | Porter et al. |
| 5,269,058 A | 12/1993 | Wiggs et al. |
| 5,429,877 A | 7/1995 | Eylon |
| 5,469,618 A | 11/1995 | LeMonds et al. |
| 5,636,440 A | 6/1997 | Bichon et al. |
| 5,711,068 A * | 1/1998 | Salt ................ 29/889.1 |
| 6,022,191 A | 2/2000 | Moore et al. |
| 6,219,916 B1 | 4/2001 | Walker et al. |
| 6,331,217 B1 | 12/2001 | Burke et al. |
| 6,871,398 B2 * | 3/2005 | Richardson et al. ..... 29/889.72 |
| 2002/0090302 A1 | 7/2002 | Norris et al. |
| 2005/0005445 A1 | 1/2005 | Ferte et al. |

FOREIGN PATENT DOCUMENTS

| | | |
|---|---|---|
| EP | 1 188 497 | 3/2002 |
| EP | 1 245 325 | 10/2002 |
| FR | 970 578 | 1/1951 |
| GB | 574 440 | 1/1946 |
| GB | 789 659 | 1/1958 |
| GB | 817660 | 8/1959 |

OTHER PUBLICATIONS

U.S. Appl. No. 10/847,398, filed May 18, 2004, Ferte, et al.

* cited by examiner

*Primary Examiner*—John C. Hong
(74) *Attorney, Agent, or Firm*—Oblon, Spivak, McClelland, Maier & Neustadt, P.C.

(57) ABSTRACT

The invention relates to a method of manufacturing a hollow blade for turbine engine comprising a foot and a rotor blade, the method comprising a production stage of two external parts (14) as well as an assembling stage via diffusion bonding of these two external parts so as to obtain a blade preform.

7 Claims, 4 Drawing Sheets

METHOD OF MANUFACTURING A HOLLOW BLADE FOR A TURBINE ENGINE

TECHNICAL FIELD

The invention generally relates to the field of methods of manufacturing blades for turbine engine, such as hollow fan blades, or any other type of rotor or stator blades for turbine engine.

STATE OF THE PRIOR ART

Usually a hollow fan blade for turbine engine comprises a relatively thick foot used to attach this blade into a rotor disk, this foot being radially extended towards the outside by a thin aerodynamic part, called rotor blade.

From the prior art we know a method of manufacturing such a hollow blade, principally based on the use of the diffusion bonding technique, associated with that of superplastic forming.

Indeed, in this method of the prior art, two or three component parts of the blade are firstly defined, then made separately before being stacked and assembled to each other via the diffusion bonding technique, with the purpose of obtaining a preform of the desired blade.

Subsequently, it is proceeded with an airfoil profiling of the previously fabricated preform, then with a bulging via gas pressure and with a superplastic forming of this preform, in order to come out with a blade substantially bearing its finished shape.

As was mentioned above, the manufacturing of the blade preform requires the making of two external parts, and possibly that of a central part intended to be interposed between these two external parts, with the purpose of being used as a stringer later on.

The manufacturing of the external parts is typically carried out through the machining of supply elements that necessarily have relatively large initial dimensions, as each of the two machined external parts must have two radially facing sections of significantly different thickness, these two component sections of the external part respectively being called the foot part and the rotor blade part.

Thus, the manufacturing of the external parts intended to constitute at least partially the blade preform, for example obtained via lamination, generates very high material costs and machining costs, and hence this method of manufacturing the hollow blade is not completely optimised.

To face up to this inconvenience, as disclosed in the document GB-A-2 306 353, the making of two external parts of the blade preform was proposed by cutting a rectangular prism along the length and along a sloping plane, so that the two surfaces obtained during the cutting operation are capable of constituting the surfaces of the two external parts intended to form later on the upper surface and the lower surface of the hollow blade.

Furthermore, the making of the two external parts of the blade preform was also proposed via forging, as disclosed in the document U.S. Pat. No. 5,636,440. However, this manufacturing technique via forging is relatively expensive to implement, as always due to the need to obtain parts each bearing an uneven thickness.

OBJECT OF THE INVENTION

The purpose of the invention is therefore to propose a method of manufacturing a hollow blade for turbine engine, resolving at least partially the aforementioned inconveniences related to the embodiments of the prior art.

More precisely, the purpose of the invention is to present a method of manufacturing a hollow blade whose production stage of the two external parts of the preform engenders significantly reduced manufacturing costs compared to those encountered in the prior art.

To accomplish this, the objective of the invention is a method of manufacturing hollow blades for turbine engine comprising a foot and a rotor blade, the method comprising a production stage of two external parts each bearing a rotor blade part and a foot part and being intended to form at least partially a blade preform, the method further comprising an assembling stage via diffusion bonding of two external parts so as to obtain the blade preform. According to the invention, the production stage of the two external parts comprises, for each of these external parts, the following operations:

the making via forging, preferably via lamination of a primary element constituting at least the rotor blade part of the external part;

the making via forging, preferably via extrusion, of at least a secondary element intended to form at least partially the foot part of the external part; and the assembling of each secondary element onto the primary element so as to obtain the external part.

Advantageously, in the method of manufacturing according to the invention, the making of the blade preform no longer integrates the very costly production of two external parts each being in one piece and intended to comprise two sections of considerably different thickness respectively being used to define the foot part and the rotor blade part of this external part.

On the contrary, each external part is made using a primary element more or less entirely constituting the foot part of the part, as well as at least one secondary element forming solely and at least partially the foot part of this said external part. In this manner, the primary elements of the external parts of the blade preform can then be wisely defined so that each has a relatively even thickness, thus naturally engendering a significant reduction in the manufacturing costs, notably in terms of material costs and machining costs.

Moreover, each secondary element not being intended to enter into the constitution of the rotor blade part of the associated external part but solely to form at least partially the foot part of the said part, it is obvious that the manufacturing costs can also be minimised, notably due to their necessary minor radial length.

In other words, the method according to the invention envisages the making of each external part of the blade preform using a plurality of elements of which one or several do not extend along the full radial length of this external part, which thus allows to easily overcome the inconveniences directly linked to the considerable variation in thickness of the external parts in their radial direction.

Preferably, the operation of assembling each secondary element onto the primary element is implemented using a technique taken from among the group constituted of linear friction welding and of friction stir welding, these techniques being preferred in that they are relatively easy to implement, reliable, inexpensive and barely destructive metallurgically speaking.

Preferably, the assembling stage via diffusion bonding of the two external parts so as to obtain the blade preform is followed by the following stages:

airfoil profiling of the preform; and bulging via gas pressure and superplastic forming of the airfoil profiling preform.

It can be envisaged that each secondary element intended to form at least partially the foot part of each of the two external parts is made via extrusion. Advantageously, this inexpensive technique to be implemented consists, from a material billet and through an appropriate die, in making a profile of the secondary element bearing the desired geometry.

In a first preferred embodiment of the method of manufacturing according to the invention, for each of the two external parts, this method is implemented so that the primary element is made in order to solely form the rotor blade part of the external part, and so that a single secondary element is made in order to wholly form the foot part of this preform.

In a second and third preferred embodiment of the method of manufacturing according to the invention, for each of the two external parts, this method is implemented so that the primary element is made in order to form the rotor blade part of the external part as well as a central section of the foot part of this external part, and so that at least one secondary element is made in order to form a section of the foot part of the external part, when it is assembled onto the primary element.

In this regard, it can be envisaged that for each of the two external parts of the blade preform, the primary element is made so as to have an external surface, and that the secondary elements are assembled onto this said external surface.

Other advantages and characteristics of the invention will appear in the detailed non-restrictive description below.

BRIEF DESCRIPTION OF THE DRAWINGS

This description will be made in relation to the annexed drawings among which.

DETAILED PRESENTATION OF THE PREFERRED EMBODIMENTS

Figure 1:
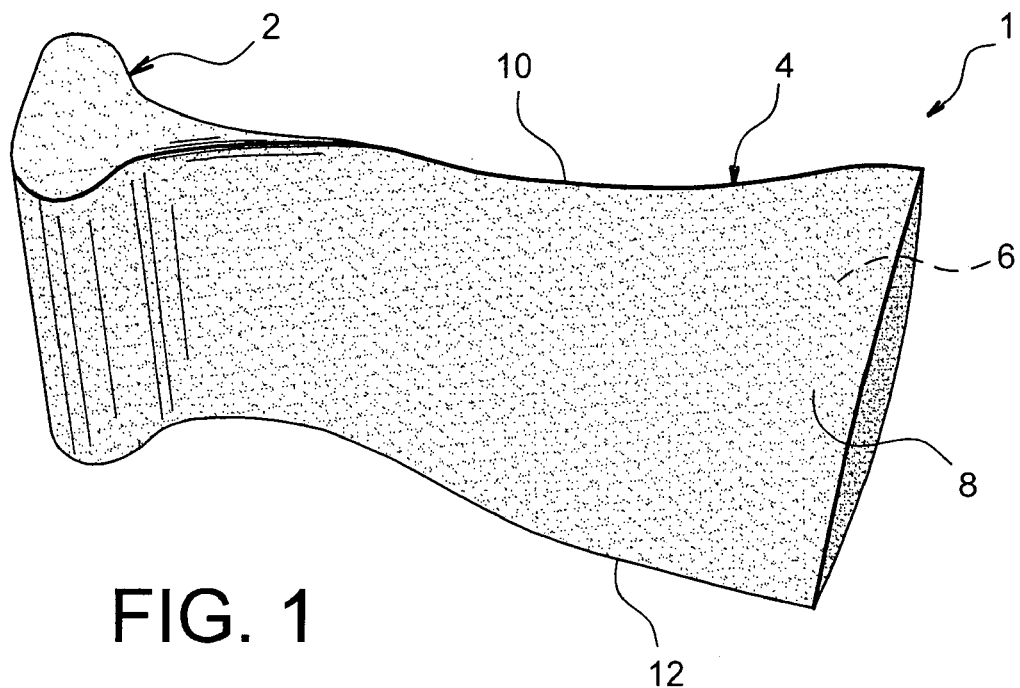
FIG. 1 represents a perspective view of a standard hollow blade for turbine engine.

In reference to FIG. 1, we can notice a standard hollow blade 1 for turbine engine (not represented), for example made in titanium or in one of its alloys.

This hollow blade 1, of fan rotor blade type with large chord, comprises a foot 2 extended by a rotor blade 4 in a radial direction.

The rotor blade 4, intended to be placed in the circulation path of an airflow of the turbine engine, has two external surfaces 6 and 8, respectively called upper surface 6 and lower surface 8, connected by a leading edge 10 and a trailing edge 12.

Figure 2:
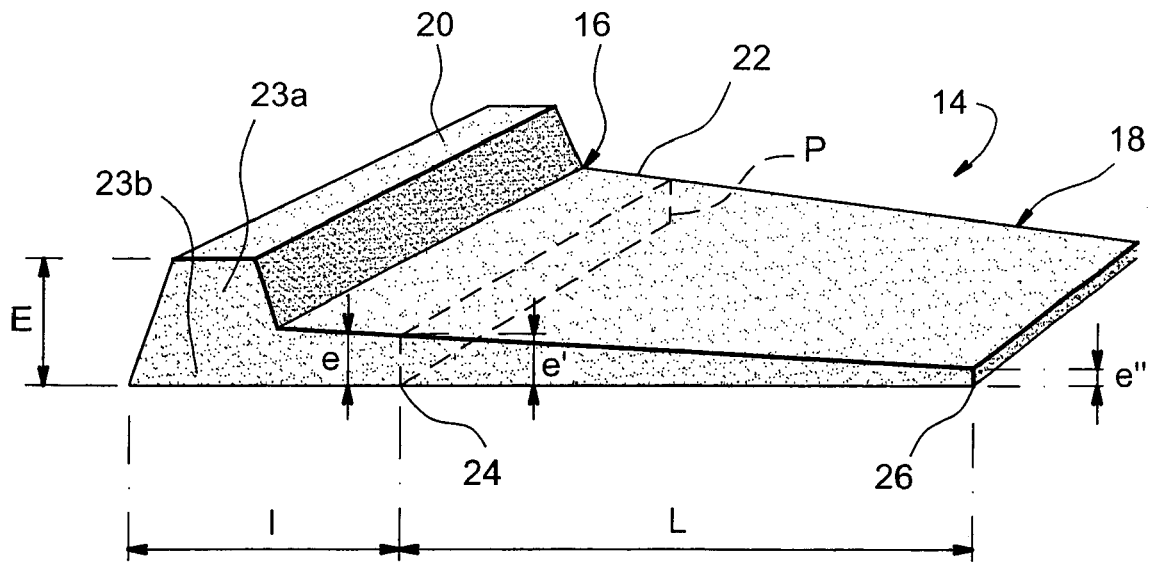
FIG. 2 represents a diagrammatic perspective view of an external part of a blade preform, obtained during the implementing of the manufacturing stage of the two external parts of the method of manufacturing according to the invention.

FIG. 2 represents an external part 14 of a blade preform, such as the one intended to be obtained following a production stage of two external parts 14, during the implementing of the method of manufacturing according to the invention.

This external part 14 comprises a foot part 16 of variable and large thickness, which is extended in a radial direction by a rotor blade part 18. As can be seen in FIG. 2, the foot part 16 has an internal radial section 20 with a high average thickness E, this section 20 being radially and externally extended by an external radial section 22 of an average thickness e inferior to the average thickness E. For information purposes it is noted that the internal radial section 20 is later intended to ensure the fixing of the blade in a rotor disk of the turbine engine, notably thanks to the projection part 23a integral to a central part 23b fitted into the extension of the external radial section 22 of the foot part 16.

Furthermore, the rotor blade part 18 of the external part 14 has a radially internal end 24 of thickness e' substantially equal to the average thickness e, and a radially external end 26 of thickness e" inferior to the thickness e'. However, the rotor blade part 18 of the part 14 has a substantially even thickness.

Furthermore, it is indicated that the radially internal end 24 ensures the junction between the rotor blade part 18 and the external radial section 22 of the foot part 16 of the external part 14, as diagrammatically shown in the fictitious junction plane P represented in FIG. 2.

Figure 3A:
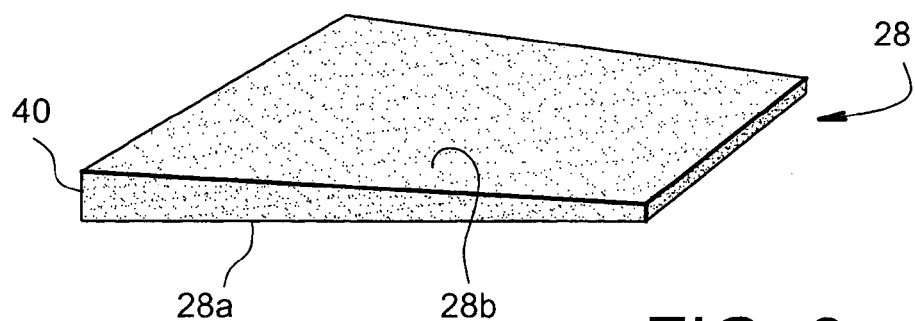
FIGS. 3a to 3e diagrammatically illustrate the stages of a first preferred embodiment of the method of manufacturing according to the invention.
Figure 3B:
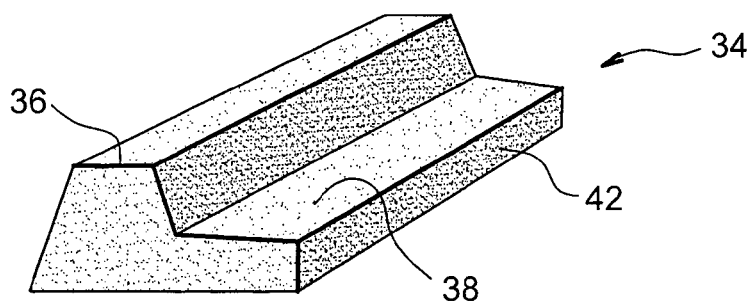
Figure 3C:
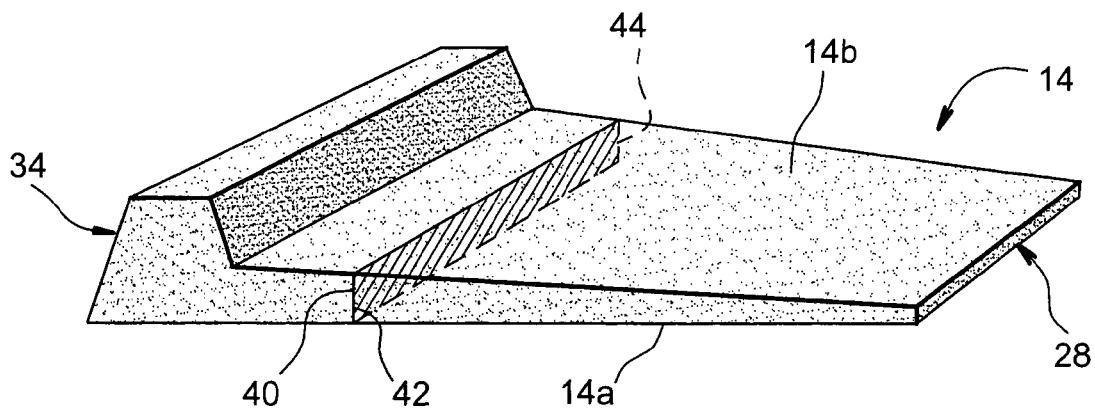

In a first preferred embodiment of the method of manufacturing according to the invention, a production stage of the two external parts 14 of the blade preform is carried out in the aforementioned manner, making reference to FIGS. 3a to 3c. In this regard, it is noted that the two external parts 14 generally being made in the same manner, only the manufacturing of one of these two parts 14 will be presented.

Thus, to manufacture an external part 14 of a blade preform, a primary element 28 is first manufactured, having an internal surface 28a as well as an external surface 28b. In this first preferred embodiment of the invention, the primary element 28 is made so that it solely forms the rotor blade part 18 of this external part 14. Consequently, the thickness of this primary element 28 is substantially even, and the manufacturing technique of the latter via forging, preferably via lamination, is therefore particularly appropriate, and entirely optimised in terms of material costs and machining costs. This is explained, as the supply element needed to manufacture it can easily have dimensions similar to the final dimensions that this said element 28 must have.

At the same time as the manufacturing of the primary element 28 solely and wholly forming the rotor blade part 18 of the external part 14, a single secondary element 34 is also made, intended in this first preferred embodiment to wholly form the foot part 16 of the said part 14. Thus, it is naturally specified that the primary element 28 and the secondary element 34 each have a respective geometry substantially identical to the geometry of the rotor blade part 18 and of the foot part 16 of the external part 14 represented in FIG. 2.

As is shown in FIG. 3b, the secondary element 34 therefore comprises a part 36 of considerable thickness similar to the internal radial section 20 represented in FIG. 2, as well as a part 38 of inferior thickness similar to the external radial section 22 represented in the said FIG. 2. The element 34 can consequently be easily made via extrusion or any other forging technique, this preferred proven low cost extrusion technique consisting, from a material billet and through an appropriate die, in making a profile of the secondary element 34 bearing the desired geometry. In this way, with such a technique, it is possible to manufacture secondary elements 34 one after the other, via single stripping of very long parts.

Once the primary element 28 and the secondary element 34 have been simultaneously made, preferably in a titanium alloy, they are then assembled in such a way so as to substantially obtain the geometry of the external part 14, as illustrated in FIG. 3c.

This assembling can thus be performed via welding, by putting an internal radial surface 40 of the primary element 28 into contact with an external radial surface 42 of the secondary element 34. These surfaces 40 and 42 are substantially flat and jointly define a flat contact zone 44, approximately placed in a location identical to that of the fictitious junction plane P represented in FIG. 2, in comparison to the foot part 16 and rotor blade part 18 of the external part 14.

By way of illustration, the assembling operation of the secondary element 34 onto the primary element 28 is preferably done via linear friction welding, or by friction stir welding. These known welding techniques advantageously allow the welded zone to keep the metallurgical characteristics compatible with the diffusion bonding and superplastic forming techniques, and ensure mechanical properties in compliance with the specifications of the finished external part.

Of course, this welding operation may be followed by a machining operation of geometric reconditioning of the welded zone, with the aim of obtaining an external part 14 of which an internal surface 14a and an external surface 14b have the expected geometry.

Figure 3D:
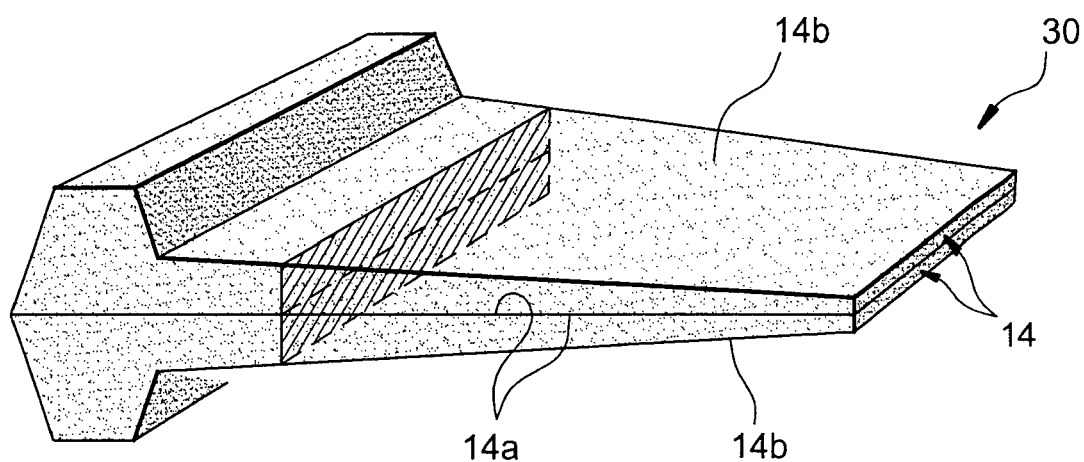

Once the two external parts 14 have been made in the manner which has just been described, for example simultaneously and so as to be substantially identical, these two parts 14 are then assembled via diffusion bonding in order to obtain the desired blade preform 30, as is illustrated diagrammatically in FIG. 3d.

In this regard, it is indicated that the preform 30 can be classically made using two identical external parts 14 with grooved internal surfaces 14a, or even using three parts of which the two identical external parts 14 have substantially smooth internal surfaces 14a in contact with a third intermediary part (not represented), intended to constitute a stringer later on.

Thus, in the case when the preform 30 is solely composed of two identical external parts 14, once these have been made as described above, they are then diffusion bonded together, in a similar manner to that encountered in the prior art to carry out the assembling of the different component parts of the preform. In this regard and in a continuous manner, it is noted that the diffusion bonding operation is preceded by a depositing operation of fuel rod coating (not represented) according to a set pattern, the coatings being applied to the internal surfaces 14a in contact with the external parts 14.

Furthermore, in the case when the preform 30 is of the type comprising three stacked parts including one intermediary part, the assembling stage via diffusion bonding of two parts 14 is carried out in a standard and similar manner, by inserting this intermediary part between the two external parts 14 so that each of these is fixed via diffusion bonding to the intermediary part.

Figure 3E:
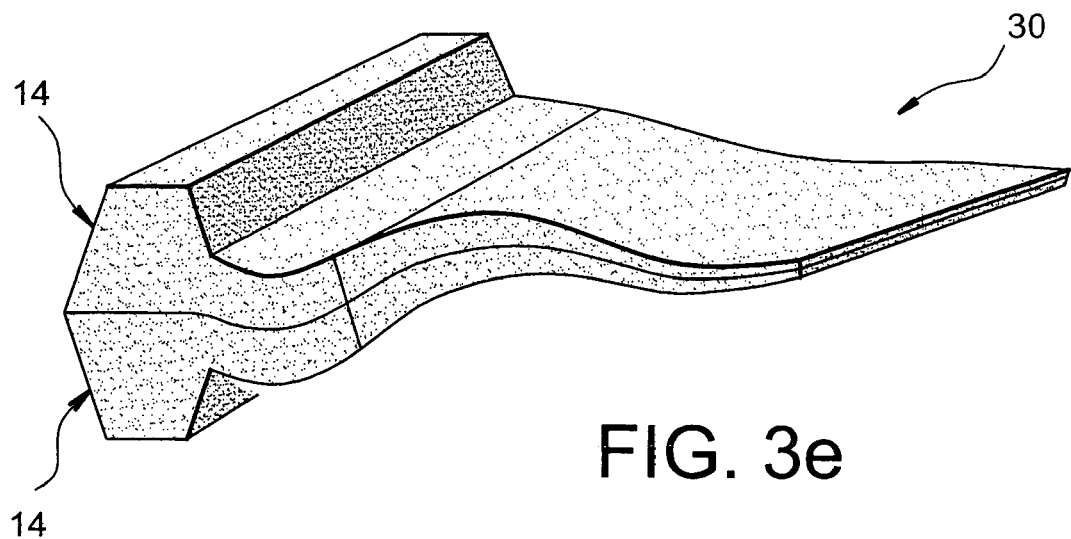

Following the production stage of the blade preform 30 which has just been described, standard stages are then carried out first of all aiming at airfoil profiling the preform 30, so that it has a substantially twisted shape as illustrated in FIG. 3e. Then, still in a continuous manner, a bulging via gas pressure and superplastic forming stage allows to obtain the blade 1 such as represented in FIG. 1, this stage being generally followed by a final machining intended to strictly give the blade 1 the desired airfoil profile.

Figure 4:
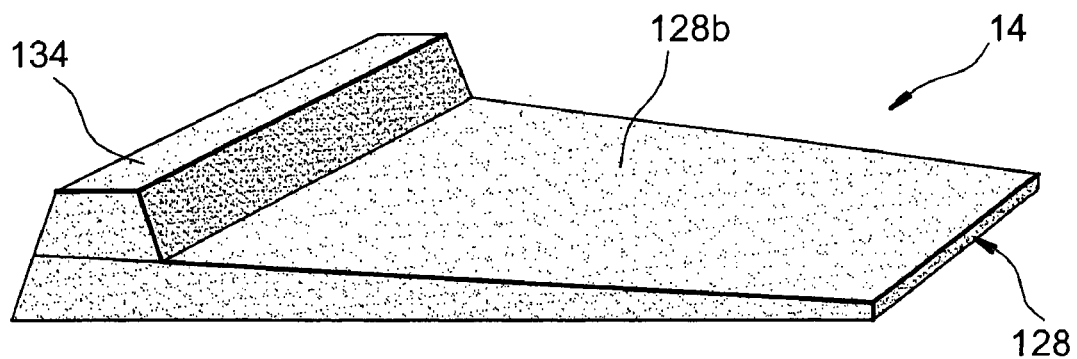
FIGS. 4 and 5 represent an external part of the blade preform, obtained during the implementing of the manufacturing stage of the two external parts of the method of manufacturing, respectively according to a second and third preferred embodiment of the invention.

FIG. 4 represents an external part 14 obtained following the implementing of the production stage of the two external parts 14, during the implementing of the method of manufacturing according to a second preferred embodiment of the invention.

In this second preferred embodiment, only this production stage of the two external parts 14 slightly differs compared to that implemented in the method of manufacturing according to the aforementioned first preferred embodiment, the other stages being substantially identical.

Indeed, a primary element 128 is made in a similar manner to that encountered in the making of the primary element 28, differing in that the primary element 128 is intended to form the rotor blade part 18 of the external part 14, as well as a central section of the foot part 16 of this said part 14. In this regard, it is noted that the central part of the foot part 16, not represented in FIG. 2, must be understood as being substantially constituted of all the external radial section 22 as well as the central part 23b of the internal radial section 20.

In this manner, as can be seen in FIG. 4, the primary element 128 therefore extends along the entire radial length of the part 14, whilst maintaining an even thickness. Consequently, here again, the technique to obtain the parts 128 via lamination is therefore particularly appropriate, and completely optimised in terms of material costs and machining costs, as the supply elements necessary for the manufacturing of these external parts 128 can easily have dimensions similar to the final dimensions that these said parts 128 must have.

Furthermore, in this second preferred embodiment of the invention, a single secondary element 134 is made so that it forms a section of the foot part 16 of the part 14, when it is assembled onto the primary element 128.

As can be seen in FIG. 4, in this second preferred embodiment, the secondary element 134 is made and assembled on an external surface 128b of the primary element 128, the latter having a substantially parallelepipedal form and being intended to constitute the projection part 23a of the internal radial section 20 of the foot part 16, represented in FIG. 2. Note that the simplified geometry of the secondary element 134 compared to that of the secondary element 34 allows to further facilitate the making of this element, preferably still using the extrusion technique described above.

Then, once the primary element 128 and the secondary element 134 have been simultaneously made, preferably in a titanium alloy, they are then assembled in such a way so as to substantially obtain the geometry of the external part 14, as illustrated in FIG. 4. Furthermore, still by way of illustration, the assembling operation of the secondary element 134 onto the primary element 128 is preferably done via linear friction welding, or by "friction stir welding".

These two external parts 14 made as indicated above are then classically assembled via diffusion bonding, so as to obtain the desired preform 30.

Figure 5:
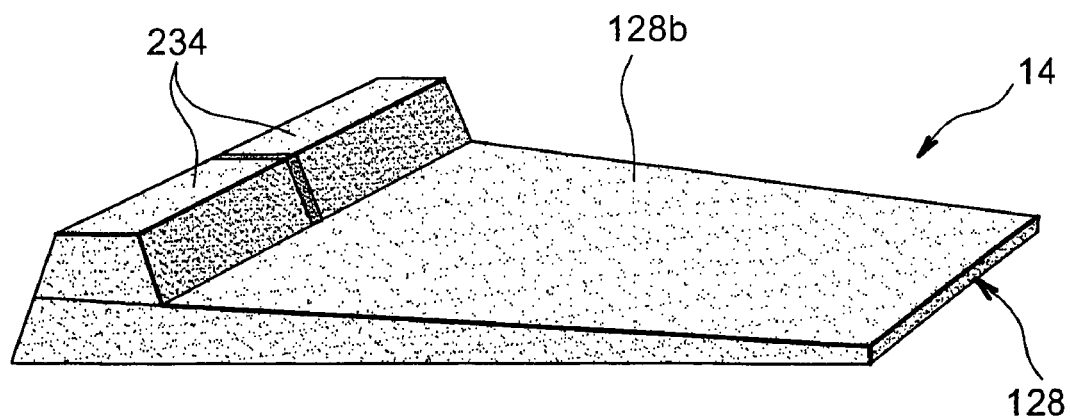

FIG. 5 represents an external part 14 obtained following the implementing of the production stage of the two external parts 14, during the implementing of the method of manufacturing according to a third preferred embodiment of the invention.

In this third preferred embodiment, only this production stage of the two external parts 14 slightly differs compared to that implemented in the method of manufacturing according to the aforementioned second preferred embodiment, the other stages being substantially identical.

Indeed, the primary element 128 is made in a similar manner to the one encountered in the second preferred embodiment, so that it forms the rotor blade part 18 of the part 14, as well as a central section of the foot part 16 of this said external part 14.

In this manner, as can be seen in FIG. 5, the primary element 128 therefore also extends along the entire radial length of the part 14, whilst maintaining an even thickness.

Nevertheless, contrary to the second preferred embodiment of the method according to the invention in which a single secondary element 134 is envisaged on the external surface 128b of the primary element 128, the third preferred embodiment envisages that two secondary elements 234 are made and assembled on this surface 128b, still in order to obtain a form substantially identical to that of the projection part 23a of the internal radial section 20 of the foot part 16.

Thus, the cutting into two secondary elements 234 of the projection part 23a allows to facilitate the linear friction welding operations of these elements 234 onto the primary element 128, and therefore the need for an industrial welding outfit of lesser efficiency than that needed for the implementing of the second preferred embodiment of the method according to the invention.

In this regard, it is indicated that the projection part 23a has been described as capable of being made using two secondary elements 234, but could of course be made with a greater number of parts, without dismissing the framework of the invention.

Of course, various modifications can be introduced by those skilled in the art into the method of manufacturing the hollow blade 1 which has just been described, solely by way of non-restrictive illustration.

The invention claimed is:

1. A method of manufacturing a hollow blade for a turbine engine comprising a foot and a rotor blade, said method comprising forming two external parts each bearing a rotor blade part and a foot part, and assembling the two external parts via diffusion bonding so as to form a blade preform, the forming each of the two external parts comprising:
   making via lamination a primary element;
   making via extrusion at least one secondary element; and
   assembling each secondary element to the primary element, such that the primary element forms at least said rotor blade part of said external part and each secondary element forms at least a portion of said foot part of said external part.

2. The method set forth in claim 1, wherein the assembling of each secondary element to the primary element is implemented with a technique selected from a group consisting of linear friction welding and friction stir welding.

3. The method set forth in claim 1 or 2, further comprising:
   airfoil profiling said preform; and
   bulging the airfoil preform via gas pressure and superplastic forming.

4. The method set forth in claim 1, wherein the primary element solely forms said rotor blade part of the external part, and a single secondary element wholly forms said foot part of the preform.

5. The method set forth in claim 1, wherein the primary element forms said rotor blade part of the external part and a central section of said foot part of the external part, and the at least one secondary element forms a section of said foot part of the external part when the at least one secondary element is assembled to the primary element.

6. The method set forth in claim 5, wherein the primary element includes an external surface, and said secondary elements are assembled onto said external surface of said primary element.

7. The method set forth in claim 1, wherein the assembling of each secondary element to the primary element is performed before assembling the two external parts via diffusion bonding.

* * * * *